UNITED STATES PATENT OFFICE.

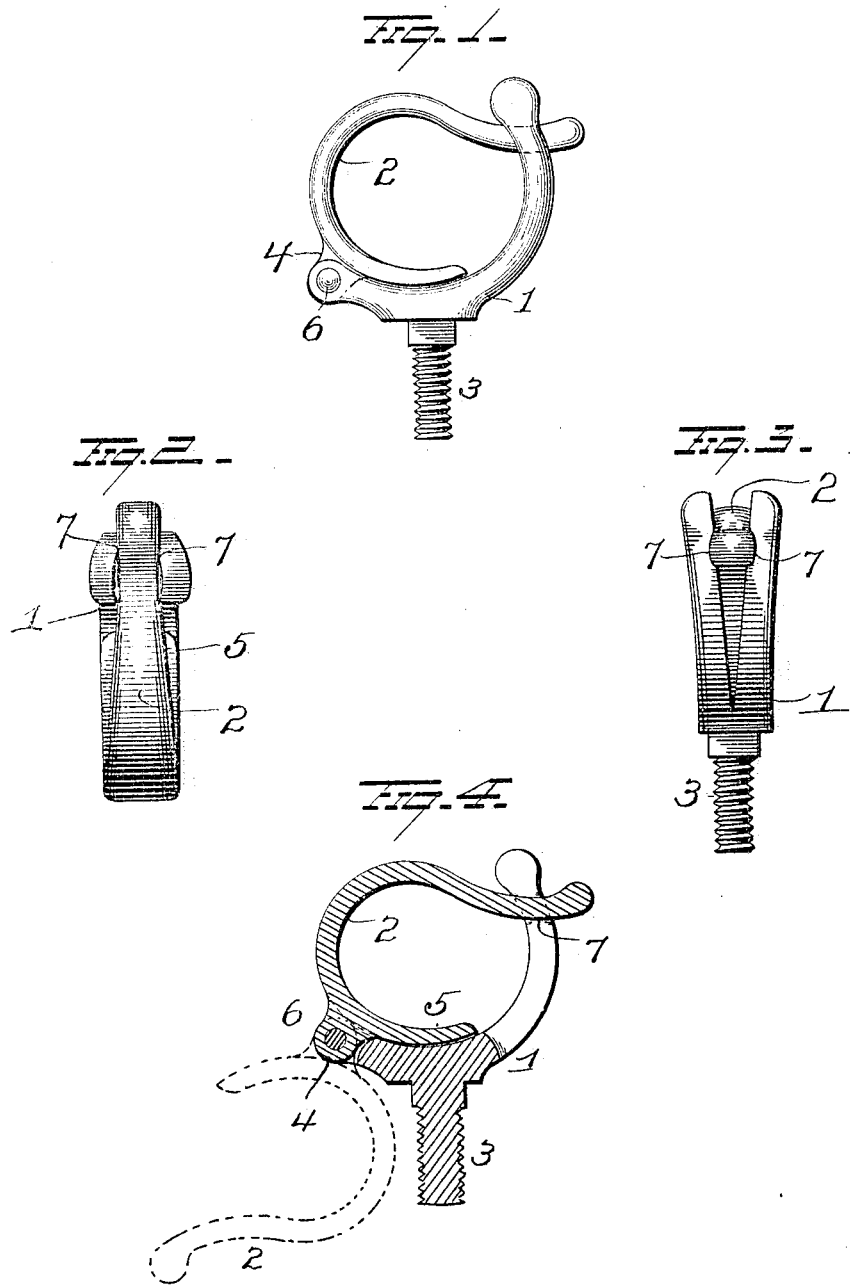

PETER S. PETERSON, OF JANESVILLE, WISCONSIN.

CHECK-HOOK.

No. 801,545.     Specification of Letters Patent.     Patented Oct. 10, 1905.

Application filed January 9, 1905. Serial No. 240,280.

*To all whom it may concern:*

Be it known that I, PETER S. PETERSON, a resident of Janesville, in the county of Rock and State of Wisconsin, have invented certain new and useful Improvements in Check-Hooks; and I do hereby declare the following to be a full, clear, and exact description of the invention, such as will enable others skilled in the art to which it appertains to make and use the same.

My invention relates to an improved check-hook, the object of the invention being to provide a check-hook of simple inexpensive construction, neat in appearance, and strong and durable in use, and which, while it will prevent the horse unchecking himself by any ordinary movement of the head, will when undue strain is brought to bear thereon—such, for instance, as the animal stumbling—release the checkrein and prevent breaking of the hook or rein.

A further object is to provide a hook which is humane in use, is safe for the animal and driver, it cannot jolt open, and may be secured to harness by any convenient or suitable method.

With these and other objects in view the invention consists in certain novel features of construction and combinations and arrangements of parts, as will be more fully hereinafter described, and pointed out in the claims.

In the accompanying drawings, Figure 1 is a view in side elevation, illustrating my improvements. Fig. 2 is a top plan view. Fig. 3 is an end view, and Fig. 4 is a view in longitudinal section.

My improved check-hook comprises two members 1 and 2, the former fixed and carrying a screw-threaded shank 3, to be secured to the saddle or harness and may be secured to the harness in any other manner found desirable. The movable hook portion 2 has a lug 4 on its under side some distance from its flat end 5, which rests on the bottom portion of member 1, and said lug 4 is located in the bifurcated forward end of member 1 and securely hinged therein by a pin 6, passed through the lug 4 and bifurcated end of member 1.

The rear end of member 1 curves upward, is slit longitudinally, and the sections so formed are flared apart to receive the rear end of hook 2, and at a suitable point in said split end notches or recesses 7 are provided in member 1 to receive and hold the hook 2 against accidental movement.

The end of hook 2 projects sufficiently far in rear of member 1 to afford a finger-hold to permit the operator to force the hook out of the split end and notches of member 1 when it is desired to check or uncheck; but the hook will be held with sufficient rigidity to prevent any possibility of the animal unchecking itself by any ordinary movement of its head. If, however, the checkrein is subjected to unusual strain—such, for instance, as when the animal stumbles—such strain will pull the hook open and release the rein before the latter could break or injury be done the harness.

While the shape of the several parts has been found to accomplish all the purposes sought, I do not restrict myself to such shape, but may variously form the hook and fixed member to suit all requirements of the trade, and hence a great many changes might be made without departing from my invention. I therefore wish it understood that I do not restrict myself to the particular construction shown and described, but consider myself at liberty to make such changes and alterations as fairly fall within the spirit and scope of my invention.

Having fully described my invention, what I claim as new, and desire to secure by Letters Patent, is—

1. A check-hook comprising a fixed member and a hinged rein-receiving member disposed opposite the fixed member, and means for temporarily uniting the free ends of said members and permitting the release of the hinged member when it is subjected to abnormal strain through the checkrein.

2. A check-hook comprising a fixed member, a rein-receiving member disposed opposite the fixed member and hinged thereto, said fixed member constructed to clamp the hinged member, normally hold it against movement and permit its release when subjected to abnormal strain through the checkrein.

3. A check-hook comprising a fixed member, and a rein-receiving hook disposed opposite the fixed member and hinged thereto, one of said members having a recess to receive the other member and normally hold the rein-receiving hook until the latter is subjected to abnormal pulling strain through the checkrein.

4. A check-hook, comprising a fixed member, a rein-receiving hook disposed opposite the fixed member and hinged thereto, and said fixed member slit to clamp the rein-receiving end of the hook and release said hook when the latter is subjected to abnormal strain through the checkrein.

5. A check-hook, comprising a fixed member, a rein-receiving hook disposed opposite the fixed member and hinged thereto near one end and at such end constructed to overlap and rest on the base of the fixed member, said fixed member projecting upward at its rear end and slit longitudinally and having notches formed in opposite faces to receive and hold the rein-receiving free end of the hook and release said hook when the latter is subjected to abnormal strain through the checkrein.

6. A check-hook, comprising a fixed member constructed to be rigidly secured to a harness, a rein-receiving hook disposed opposite the fixed member and hinged to the forward end thereof, the rear end of the fixed member, curved upward, split longitudinally and flared, and having notches formed in opposite faces to receive and hold the free end of the rein-receiving hook until the latter is subjected to undue strain through the checkrein.

7. A check-hook comprising a fixed member, and a rein-receiving hook member disposed opposite the fixed member and hinged thereto, one of said members having an opening to permit the passage transversely through it of the free end of the other member and retain the rein-receiving hook member until it is subjected to undue strain through the checkrein.

In testimony whereof I have signed this specification in the presence of two subscribing witnesses.

PETER S. PETERSON.

Witnesses:
   FLOSS M. APPLEBY,
   ALEXANDER E. MATHESON.